(12) United States Patent
Chivilikhin et al.

(10) Patent No.: US 9,636,691 B2
(45) Date of Patent: May 2, 2017

(54) INTEGRATED CYCLONE SEPARATION DEVICE

(71) Applicants: CORNING INCORPORATED, Corning, NY (US); ExxonMobil Research and Engineering Company, Annandale, NJ (US)

(72) Inventors: Mikhail Sergeevich Chivilikhin, St. Petersburg (RU); Amit Halder, Painted Post, NY (US); Paul Oakley Johnson, Corning, NY (US); Ameya Joshi, Horseheads, NY (US); Randall D Partridge, Califon, NJ (US)

(73) Assignees: Corning Incorporated, Corning, NY (US); Exxonmobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 14/118,057

(22) PCT Filed: Nov. 16, 2012

(86) PCT No.: PCT/US2012/065478
§ 371 (c)(1),
(2) Date: Nov. 15, 2013

(87) PCT Pub. No.: WO2014/077832
PCT Pub. Date: May 22, 2014

(65) Prior Publication Data
US 2015/0238980 A1 Aug. 27, 2015

(51) Int. Cl.
*B01D 50/00* (2006.01)
*B04C 9/00* (2006.01)
(Continued)

(52) U.S. Cl.
CPC ............ *B04C 9/00* (2013.01); *B01D 17/0217* (2013.01); *B01D 45/12* (2013.01); *B01D 61/362* (2013.01);
(Continued)

(58) Field of Classification Search
CPC .... B04C 9/00; B04C 5/13; B04C 5/14; B04C 5/04; B04C 5/081; B04C 2009/002;
(Continued)

(56) References Cited

U.S. PATENT DOCUMENTS 1,023,082 A * 4/1912 Kluge ................... A47L 9/1625
209/723
1,853,868 A * 4/1932 Lucke ................... B01D 45/16
55/337

(Continued)

FOREIGN PATENT DOCUMENTS

CN 201760348 U 3/2011
DE 3034400 A1 3/1982
(Continued)

OTHER PUBLICATIONS

U.S. Appl. No. 61/476,988.
(Continued)

*Primary Examiner* — Dung H Bui
(74) *Attorney, Agent, or Firm* — Susan S. Wilks; Brian A. Tent

(57) ABSTRACT

Cyclonic separation devices and fluid stream separating apparatuses incorporating cyclonic separation devices are described. A cyclonic separation device may include an exterior housing having an exterior cylindrical portion and an exterior conical portion extending from the exterior cylindrical portion and an interior housing having an interior cylindrical portion and an interior conical portion extending from the interior cylindrical portion. The interior housing is (Continued)

positioned relative to the exterior housing to form a circulating chamber. The cyclonic separation device also includes a fluid inlet coupled to the exterior housing, where the fluid inlet positioned to inject a fluid stream into the circulating chamber at an orientation generally tangential to the cylindrical portions of the exterior housing and the interior housing. The cyclonic separation device further includes a low-density outlet coupled to at least one of the exterior conical portion or the interior conical portion.

14 Claims, 10 Drawing Sheets

(51) Int. Cl.
| | | |
|---|---|---|
| *B01D 17/02* | (2006.01) | |
| *B01D 45/12* | (2006.01) | |
| *B01D 63/06* | (2006.01) | |
| *B04C 5/04* | (2006.01) | |
| *B04C 5/081* | (2006.01) | |
| *B04C 5/13* | (2006.01) | |
| *B04C 5/14* | (2006.01) | |
| *B01D 61/36* | (2006.01) | |

(52) U.S. Cl.
CPC ............. *B01D 63/066* (2013.01); *B04C 5/04* (2013.01); *B04C 5/081* (2013.01); *B04C 5/13* (2013.01); *B04C 5/14* (2013.01); *B01D 2311/2676* (2013.01); *B01D 2313/26* (2013.01); *B04C 2009/002* (2013.01)

(58) Field of Classification Search
CPC .... B01D 61/362; B01D 63/066; B01D 45/12; B01D 17/0217; B01D 2313/26; B01D 2311/2676
USPC ...................... 55/452–455, 337, 426; 95/271
See application file for complete search history.

(56) References Cited

U.S. PATENT DOCUMENTS

| | | | | |
|---|---|---|---|---|
| 2,153,270 | A | * | 4/1939 | Osgood ..................... B04C 5/12 55/298 |
| 3,925,045 | A | * | 12/1975 | Cheng ....................... B04C 3/00 55/345 |
| 5,106,514 | A | * | 4/1992 | Alexander ......... B01D 17/0214 209/710 |
| 6,129,775 | A | * | 10/2000 | Conrad .................. A47L 9/1608 55/337 |
| 7,708,151 | B2 | | 5/2010 | Peiffer et al. |
| 8,119,006 | B2 | | 2/2012 | Patil et al. |
| 2005/0284814 | A1 | | 12/2005 | Mairal et al. |
| 2008/0035557 | A1 | | 2/2008 | Partridge et al. |
| 2010/0059441 | A1 | | 3/2010 | Pattil et al. |
| 2010/0264088 | A1 | * | 10/2010 | Yilikangas ......... B01D 17/0217 210/665 |
| 2012/0017553 | A1 | * | 1/2012 | Park ...................... A47L 9/1683 55/419 |
| 2012/0227585 | A1 | * | 9/2012 | Akdim ............... B01D 17/0217 95/271 |
| 2013/0091810 | A1 | * | 4/2013 | Smith ................... A47L 9/0081 55/315.2 |
| 2015/0040761 | A1 | * | 2/2015 | Kramer .................... B04C 5/04 95/219 |

FOREIGN PATENT DOCUMENTS

| | | |
|---|---|---|
| DE | 102007036893 A1 | 2/2009 |
| WO | 2011004789 A2 | 1/2011 |
| WO | 2011010849 A1 | 4/2011 |
| WO | 2011039783 A1 | 4/2011 |

OTHER PUBLICATIONS

Zheng; "Numerical Simulation of Effect of Inlet Configuration on Square Cyclone Separator Performance" Powder Technology; vol. 210; Issue 3, Jul. 10, 2011; pp. 293-303.

* cited by examiner

INTEGRATED CYCLONE SEPARATION DEVICE

CROSS-REFERENCE TO RELATED APPLICATIONS

This application claims the benefit of priority under 35 U.S.C. §365 of International Patent Application Serial No. PCT/US12/65478 filed on Nov. 16, 2012 designating the United States of America the content of which is relied upon and incorporated herein by reference in its entirety.

Field

The present specification generally relates to cyclonic separation devices and, more specifically, to cyclonic separation devices used to separate high-density fluid components from low-density fluid components.

Technical Background

Membrane separation devices separate a fluid stream into a retentate portion and a permeate portion. The rate at which the membrane separation device separates the permeate portion from the retentate portion of the fluid stream may be reduced with increased use of the membrane separation device. For example, in co-pending U.S. patent application Ser. No. 13/686,208 an improved membrane separation process using mixed vapor-liquid feed is disclosed whereby the highest boiling liquid fraction of gasoline feed is separated from the saturated vapor feed to the pervaporation membrane thereby extending the useful lifetime of the membrane. In this example, the higher density liquid fraction of the mixed vapor-liquid feed is separated from the lower density vapor fraction of the feed.

Because the higher density liquid portion of the fluid feed stream tends to "age" the membrane separation device, thereby reducing the effectiveness of separation of the membrane separation device, reducing the amount of the higher density liquid portion in the fluid stream before introducing the remaining lower density vapor fluid stream to the membrane separation device may increase the useful life of the membrane separation device.

Accordingly, a need exists for methods and devices for separating high-density fluid components from low-density fluid components before entering a membrane separation device.

SUMMARY

According to various embodiments, a cyclonic separation device for separating a fluid stream into high-density components and low-density components includes an exterior housing having an exterior cylindrical portion and an exterior conical portion extending from the exterior cylindrical portion and an interior housing having an interior cylindrical portion and an interior conical portion extending from the interior cylindrical portion. The interior housing is positioned relative to the exterior housing to form a circulating chamber. The cyclonic separation device also includes a fluid inlet coupled to the exterior housing, where the fluid inlet positioned to inject a fluid stream into the circulating chamber at an orientation generally tangential to the cylindrical portions of the exterior housing and the interior housing. The cyclonic separation device further includes a low-density outlet coupled to at least one of the exterior conical portion or the interior conical portion, where the low-density outlet is adapted to extract the low-density components from the circulating chamber.

According to further embodiments, a cyclonic separation device for separating a fluid stream into high-density components and low-density components includes a housing having an interior wall and an exterior wall that define a circulating chamber, where the interior wall has a maximum diameter D, and a spacing between the interior wall and the exterior wall is less than about 0.2*D. The cyclonic separation device also includes a fluid inlet coupled to the housing and positioned to inject a fluid stream into the circulating chamber at an orientation generally tangential to the interior wall and the exterior wall of the housing at positions proximate to the fluid inlet. The cyclonic separation device further includes a low-density outlet coupled to the housing and located at a radial position inwards of the fluid inlet. The interior wall and the exterior wall of the housing direct the fluid stream from the fluid inlet towards the low-density outlet.

According to still further embodiments, a fluid stream separating apparatus for separating a fluid stream into multiple components includes a ceramic monolith and a cyclonic separation device. The ceramic monolith includes an array of parallel channels separated by porous channel walls extending along an axial length of the ceramic monolith, and a functional membrane coating a plurality of the porous channel walls of the ceramic monolith. The functional membrane functions to separate the fluid stream into a retentate portion and a permeate portion, where the retentate portion exits the ceramic monolith in substantial portion through the array of parallel channels and the permeate portion exits the ceramic monolith radially outward through a skin of the porous ceramic monolith. The cyclonic separation device separates the fluid stream into high-density components and low-density components. The cyclonic separation device is in fluid communication with the ceramic monolith and includes a housing comprising an interior wall and an exterior wall that define a circulating chamber, a fluid inlet coupled to the housing and positioned to inject a fluid stream into the circulating chamber at an orientation generally tangential to the walls of the housing at positions proximate to the fluid inlet, and a low-density outlet coupled to the housing and located at a radial position inwards of the fluid inlet. The interior wall and the exterior wall of the housing direct the fluid stream from the fluid inlet towards the low-density outlet.

Additional features and advantages of the embodiments described herein will be set forth in the detailed description which follows, and in part will be readily apparent to those skilled in the art from that description or recognized by practicing the embodiments described herein, including the detailed description that follows, the claims, as well as the appended drawings.

It should be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
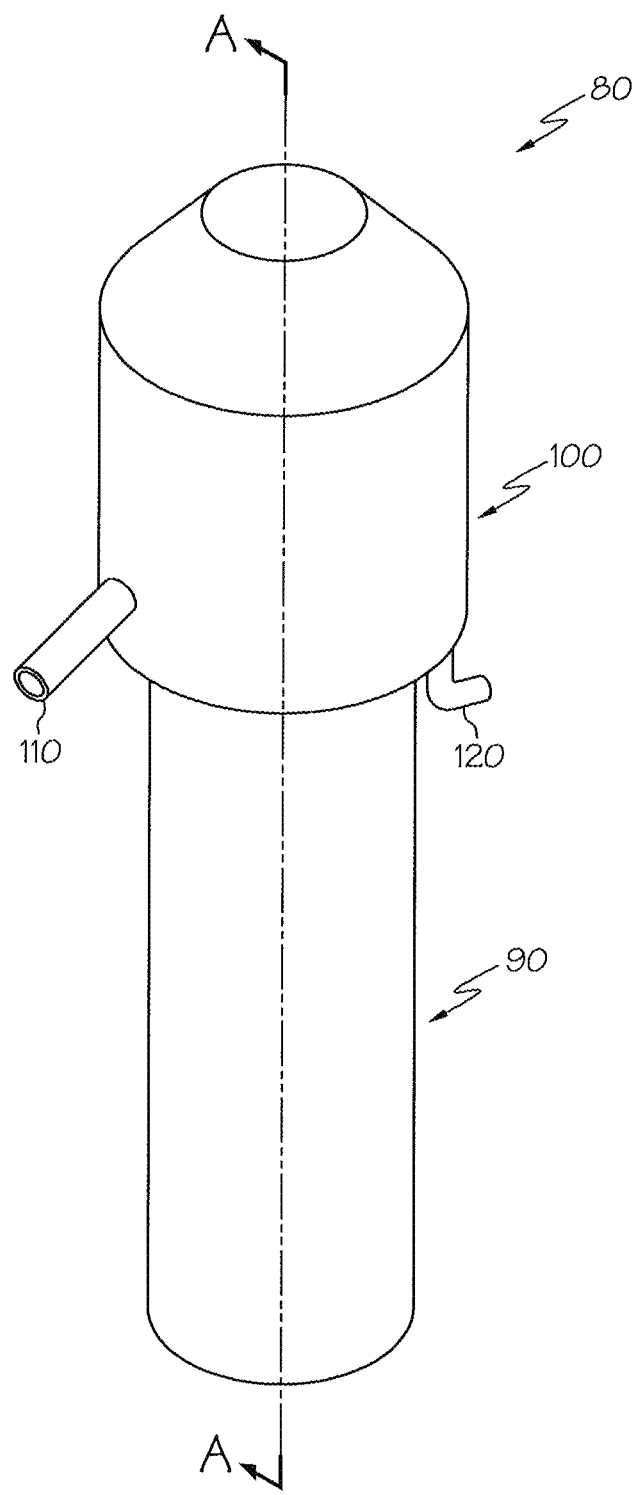
FIG. 1 schematically depicts a side schematic view of a fluid stream separating apparatus having a cyclonic separation device according to one or more embodiments shown or described herein.

Reference will now be made in detail to embodiments of cyclonic separation devices that separate a fluid stream into a low-density component and a high-density component. Whenever possible, the same reference numerals will be used throughout the drawings to refer to the same or like parts. One example of a fluid stream separating apparatus including a ceramic monolith having a functional membrane and a cyclonic separation device in fluid communication with the ceramic monolith is illustrated in FIGS. 1-5. The cyclonic separation device separates a fluid stream introduced thereto into high-density components and low-density components. The cyclonic separation device includes a housing having an interior wall and an exterior wall that define a circulating chamber. The fluid stream is introduced to the circulating chamber through a fluid inlet coupled to the housing and positioned to inject a fluid into the circulating chamber at an orientation generally tangential to the walls of the housing at positions proximate to the fluid inlet. The cyclonic separation device also includes a low-density outlet coupled to the housing and located at a radial position inwards of the fluid inlet. The interior wall and exterior wall of the housing direct the fluid stream from the fluid inlet towards the low-density outlet. Fluid stream separating apparatuses and cyclonic separation devices will be described in more detail herein with specific reference to the appended drawings.

Referring now to FIGS. 1-5, one embodiment of the fluid stream separating apparatus 80 is depicted. The fluid stream separating apparatus 80 includes a ceramic monolith 90 and a cyclonic separation device 100 in fluid communication with the ceramic monolith 90. A fluid stream is introduced to the cyclonic separation device 100 through a fluid inlet 110. The cyclonic separation device 100 separates the fluid stream into high-density components and low-density components. The high-density components of the fluid stream exit the cyclonic separation device 100 at the high-density outlet 120. The low-density components of the fluid stream exit the cyclonic separation device 100 at the low density outlet 130.

Figure 2:
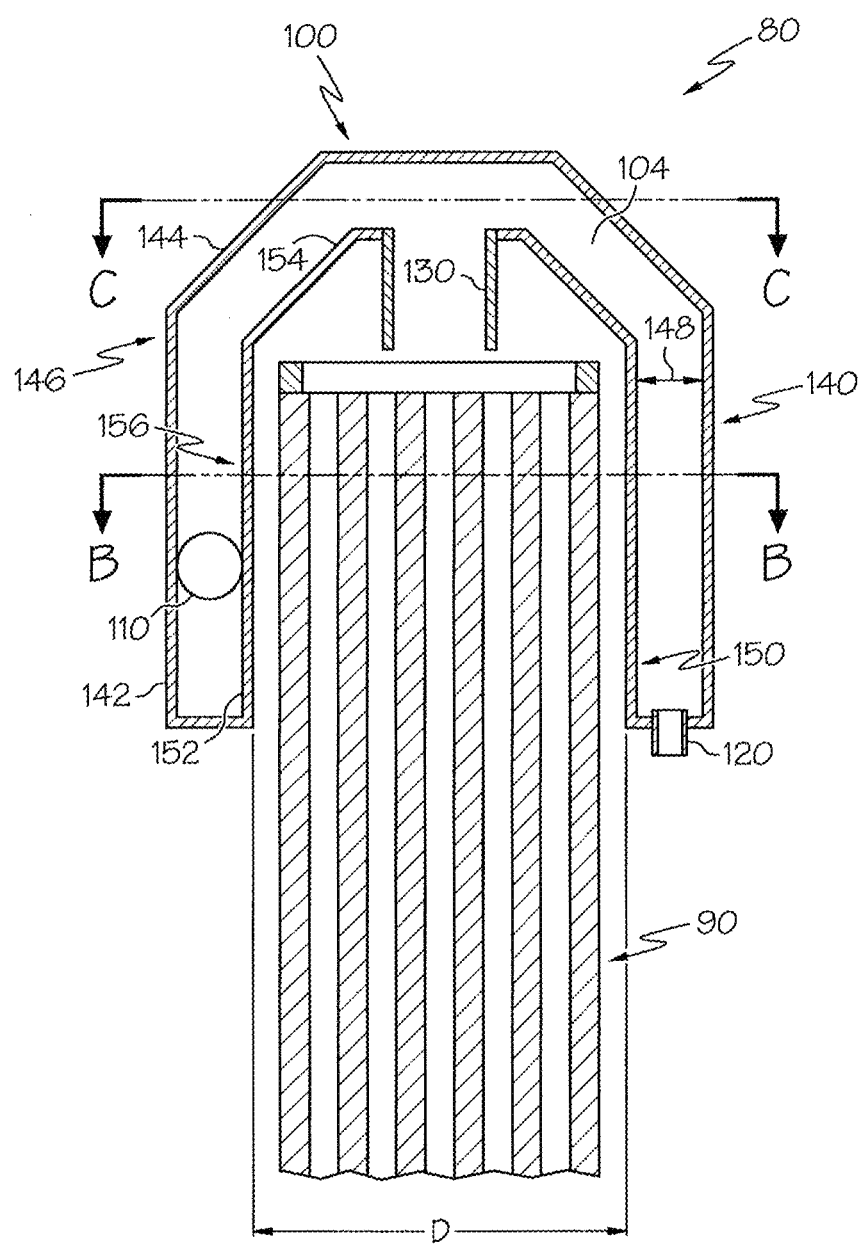
FIG. 2 schematically depicts a side sectional view of a fluid stream separating apparatus having a cyclonic separation device shown along line A-A of FIG. 1.

Referring now to FIG. 2, the fluid stream separating apparatus 80 is shown in cross-section. In the embodiment depicted in FIG. 2, the fluid stream separating apparatus 80 includes a cyclonic separation device 100 positioned to surround at least a portion of the ceramic monolith 90. The cyclonic separation device 100 includes an exterior housing 140 that includes an exterior cylindrical portion 142 and an exterior conical portion 144 extending from the exterior cylindrical portion 142. The exterior cylindrical portion 142 and the exterior conical portion 144 define the exterior wall 146 of the cyclonic separation device 100. The cyclonic separation device 100 also includes an interior housing 150 that includes an interior cylindrical portion 152 and an interior conical portion 154. The interior cylindrical portion 152 and the interior conical portion 154 define the interior wall 156 of the cyclonic separation device 100.

The interior housing 150 is positioned inside of the exterior housing 140, such that the interior housing 150 and the exterior housing 140 form a circulating chamber 104. In the embodiment depicted in FIG. 2, the interior cylindrical portion 152 is diametrically inset from the exterior cylindrical portion 142 and positioned to be generally concentric with the exterior cylindrical portion 142. Further, the interior conical portion 154 is inset from the exterior conical portion 144. In the embodiment depicted in FIG. 2, the interior conical portion 154 is generally parallel to the exterior conical portion 144.

The cyclonic separation device 100 further includes a low-density outlet 130 coupled to one of the exterior housing 140 or the interior housing 150. In the embodiment of the cyclonic separation device 100 depicted in FIG. 2, the low-density outlet 130 is coupled to the interior housing 150 and extends downwards towards the ceramic monolith 90. The low-density outlet 130 places the circulating chamber 104 of the cyclonic separation device 100 in fluid communication with the ceramic monolith 90. In the embodiment depicted in FIG. 2, the low-density outlet 130 is positioned at a radial position inwards of the exterior cylindrical portion 142 of the exterior housing 140 and at a radial position inwards of the interior cylindrical portion 152 of the interior housing 150. The low-density outlet 130 is spaced apart from the interior cylindrical portion 152 of the interior housing 150. The cyclonic separation device 100 also includes a high-density outlet 120 in fluid communication with the circulating chamber 104. The high-density outlet 120 is positioned near the bottom of the circulating chamber 104, such that high-density components that are collected along the exterior housing 140 and the interior housing 150 can flow from the circulating chamber 104.

The interior cylindrical portion 152 of the interior housing 150 has an outer diameter D. In some embodiments, the outer diameter D is sized such that the interior housing 150 surrounds at least a portion of the ceramic monolith 90. Further, the cyclonic separation device 100 includes a spacing 148 between the interior cylindrical portion 152 and the exterior cylindrical portion 142. In some embodiments, the spacing 148 between the interior cylindrical portion 152 and the exterior cylindrical portion 142 may be less than about 0.2*D. In one embodiment, the outer diameter D may be about 2.3 inches, and the spacing 148 between the interior cylindrical portion 152 and the exterior cylindrical portion 142 may be about 0.35 inches, such that the spacing between the interior cylindrical portion 152 and the exterior cylindrical portion 142 is about 0.15*D. In yet other embodiments, the spacing 148 between the interior cylindrical portion 152 and the exterior cylindrical portion 142 may less than about 0.75*D. In yet another embodiment, the outer diameter D may be about 2.3 inches and the spacing 148 between the interior cylindrical portion 152 and the exterior cylindrical portion 142 may be about 0.1 inches, such that the spacing 148 between the interior cylindrical portion 152 and the exterior cylindrical portion 142 is about 0.043*D.

While the embodiment of the cyclonic separation device 100 depicted in FIGS. 1-2 and 4-5 exhibits a single fluid inlet 110, a single low-density outlet 130, and a single high-density outlet 120, it should be understood that cyclonic separation devices 100 according the present disclosure may include a plurality of fluid inlets 110, low-density outlets 130, and high-density outlets 120, as required by a particular end-user application.

Figure 3:
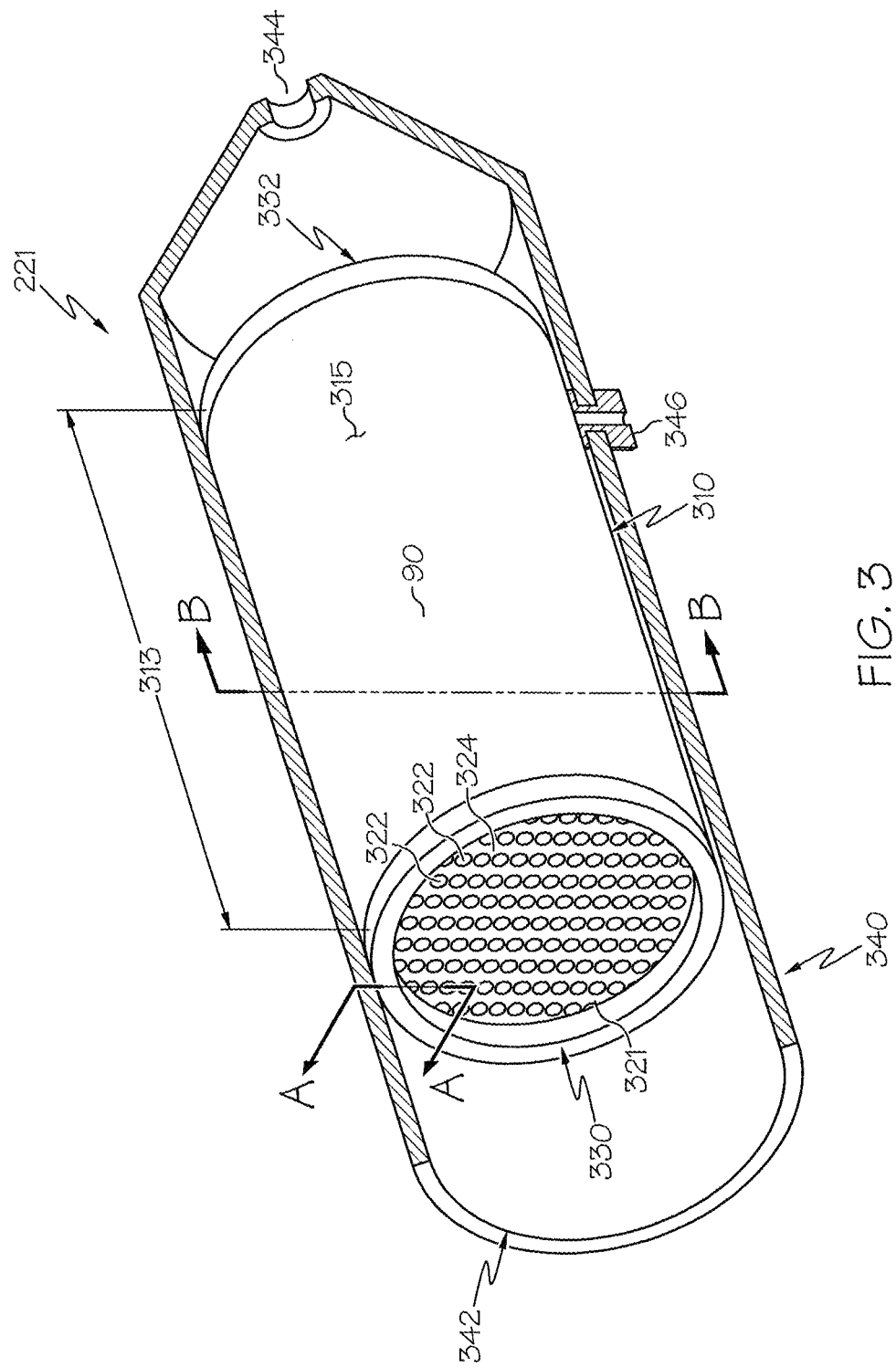
FIG. 3 schematically depicts a partial side sectional view of a ceramic monolith for a fluid stream separating apparatus according to one or more embodiments shown or described herein.

Referring now to FIG. 3, the ceramic monolith 90 for the fluid stream separating apparatus 80 is shown in detail. The ceramic monolith 90 is a honeycomb-like structure that includes a plurality of parallel flow channels 322 separated by porous channel walls 324. A plurality of the porous channel walls 324 are coated with a functional membrane along an axial length 313 of the ceramic monolith 90. The ceramic monolith 90 has a porous skin 315, which is the outer-most surface of the ceramic monolith 90. The ceramic monolith 90 separates a fluid stream into a retentate portion that flows in substantial portion within the parallel flow channels 322 along the length of the ceramic monolith 90 and a permeate portion that flows in substantial portion through the porous channel walls 324 and is collected independently of the retentate portion. The functional membrane separates fluid flowing through the ceramic monolith 90 into a retentate portion and a permeate portion by a pervaporation process. Examples of such pervaporation members are described in U.S. Pat. Pub. No. 2008/0035557 and U.S. Pat. No. 8,119,006.

The term "pervaporation" refers to the ability of the targeted fluid to flow through the functional membrane on the porous channel walls 324. This phenomenon is a solution diffusion process, which is characterized by a sorption of the feed components into the membrane (characterized by Si, for solubility of a given component), diffusion through the membrane (characterized by Di, for diffusivity of a given component), and desorption of the component from the backside of the membrane into the body of the monolith. The S and D are different for each species in the feed to the assembly. This provides the permeability or permeation rate, Pi, of a given material as Di×Si. Furthermore, selectivity, $\alpha_{i/j}$ of a species in ratio to another is given by Pi/Pj. The functional membrane may be used to separate fluid streams having a variety of components. In one embodiment, for example and not limitation, the functional membrane allows for separation of the fluid stream that is a liquid and/or vapor fuel having an intermediate-Research Octane Number (RON). The fluid stream may be separated into a permeate portion (i.e., fuel having a high-RON component) and a retentate portion (i.e., fuel having a low-RON component). Separating a fluid stream of fuel into a fuel having a high-RON component and a low-RON component may allow for the high-RON component to be introduced to engine cylinders on demand as to reduce the likelihood of engine knock when using fuel having a comparatively lower intermediate-RON, as described in for example U.S. Pat. No. 8,051,828 B2.

Fuel having an intermediate-RON is introduced to the fluid separating member 321 through the separating member inlet 342. The fuel is passed into the flow channels 322 of the ceramic monolith 90. The fuel enters at the inlet side 330 and flows towards the outlet side 332. As the fuel flows along the flow channels 322 of the ceramic monolith 90, the high-RON component of the fuel permeates through the functional membrane coated on the porous channel walls 324. The high-RON component permeates outwards of the ceramic monolith 90 to a position outside of the skin 315, where it is collected in the housing 340. The high-RON component of the fuel exits the housing 340 at a permeate outlet 346.

The low-RON component of the fuel flows along the flow channels 322 of the ceramic monolith 90. The functional membrane coating the porous channel walls 324 prevents the low-RON component from permeating through the porous channel walls 324. The low-RON component of the fuel flows along the axial length 323 of the ceramic monolith 90 and exits the housing 340 at a retentate outlet 344.

In the embodiments described herein, the ceramic monolith 90 may be formed with a channel density of up to about 500 channels per square inch (cpsi). For example, in some embodiments, the ceramic monolith 90 may have a channel density in a range from about 70 cpsi to about 400 cpsi. In some other embodiments, the ceramic monolith 90 may have a channel density in a range from about 200 cpsi to about 250 cpsi or even from about 70 cpsi to about 150 cpsi.

In the embodiments described herein, the porous channel walls 324 of the ceramic monolith 90 may have a thickness of greater than about 10 mils (254 microns). For example, in some embodiments, the thickness of the porous channel walls 324 may be in a range from about 10 mils (254 microns) to about 30 mils (762 microns). In some other embodiments, the thickness of the porous channel walls 324 may be in a range from about 15 mils (381 microns) to about 26 mils (660 microns), or greater. Wall thickness may be greater than 1 mm at times at the outer diameter.

In the embodiments of the fluid separating member 321 described herein the porous channel walls 324 of the ceramic monolith 90 may have a bare open porosity % P (i.e., the porosity before any coating is applied to the ceramic monolith 90)≥35% prior to the application of any coating to the ceramic monolith 90. In some embodiments the bare open porosity of the porous channel walls 324 may be such that 20%≤% P≤60%. In other embodiments, the bare open porosity of the porous channel walls 324 may be such that 25%≤% P≤40%.

In general, ceramic monoliths 90 produced with a mean pore size greater than about 1 micron make it difficult to produce a viable membrane coating on the substrate. Accordingly, it is generally desirable to maintain the mean pore size of the porous channel walls 324 between about 0.01 microns and about 0.80 microns.

In the embodiments described herein the honeycomb body of the ceramic monolith 90 is formed from a ceramic material such as, for example, cordierite, mullite, silicon carbide, aluminum oxide, aluminum titanate or any other porous material suitable for use in elevated temperature particulate filtration applications.

The ceramic monolith 90 includes an array of flow channels that are separated by porous channel walls 324. The porous channel walls 324 extend along an axial length 323 of the ceramic monolith 90. The porous channel walls 324 allow a fluid to permeate through the porous channel walls 324 between adjacent flow channels 322. A plurality of the porous channel walls 324 are coated with a functional membrane. The functional membrane is permeable to some portions of the fluid stream and less or impermeable to others. By passing a fluid through the fluid separating member 321, the functional membrane separates the fluid into a retentate portion that flows through the plurality of flow channels 322, and a permeate portion that passes through the coated porous channel walls 324.

In some embodiments, the porous channel walls 324 are coated with an inorganic coating layer that is an applied intermediate layer that improves bonding performance of the functional membrane to the porous channel walls 324.

Examples of the functional membrane include Diepoxyoctane-Poly(propyleneglycol)bis(2-aminopropylether) (MW400), or DENO-D400, a crosslinked organic polymeric material. In one example, when coated on a porous medium, DENO D400 allows for a fluid stream, such as liquid and/or vaporized fuel having high-RON (for example, the portion of the fuel having a RON greater than about 100) to pass through the polymer film and the porous medium, while preventing liquid and/or vaporized fuel having a low-RON from passing through the polymer film and the porous medium. The polymer film behaves like an immobilized liquid when coated on the porous medium. Thus, the functional membrane separates a stream of fuel into a retentate portion having a low-RON and a permeate portion having a high-RON. While one example of a functional membrane polymer is DENO-D400, it should be understood that other functional membranes could be used such as polyester polyimide and other polyether epoxyamines. Examples of the functional membrane include those disclosed in U.S. Pat. Nos. 7,708,151 and 8,119,006 and U.S. Pat. Pub. No. 2008/0035557, and U.S. Pat. Pub. No. 20100059441.

Performance of the pervaporation process conducted by the functional membrane coated on the ceramic monolith 90 may decrease over time, as the functional membrane remains in contact with the fluid stream and "ages." Aging of the functional membrane may be exacerbated by remaining in contact with certain components of the feed fluid stream. In general, such components, are less volatile than the primary components of the permeate portion, and exhibit higher boiling points and molecular weights than the components of the permeate portion. Removal of at least a portion of these components of the from the fluid feed stream before the fluid stream reaches the ceramic monolith 90 may decrease the effects of aging of the functional membrane and may increase the functional life of the ceramic monolith 90.

Figure 4:
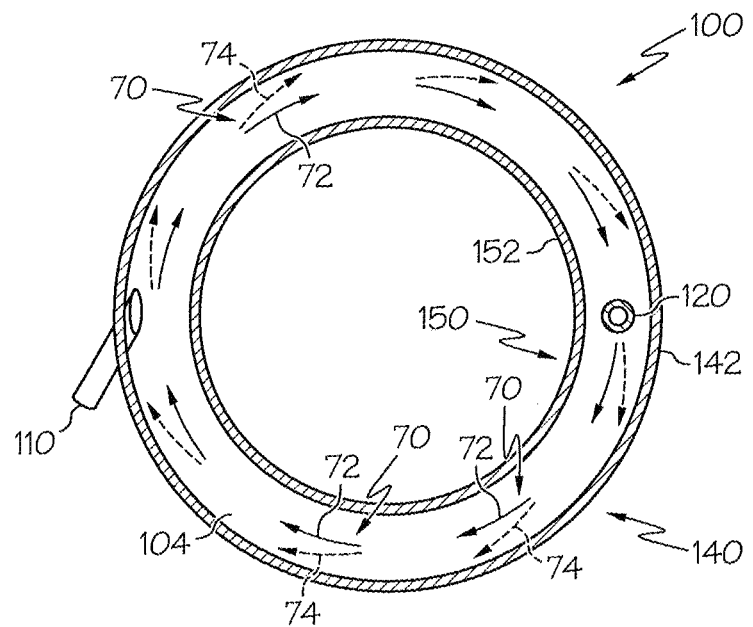
FIG. 4 schematically depicts a top sectional view of a cyclonic separation device shown along line B-B of FIG. 2.

Operation of the cyclonic separation device 100 will be discussed in reference to FIGS. 4 and 5. The cross-section of the cyclonic separation device 100 depicted in FIG. 4 is positioned at a vertical position above fluid inlet 110. The fluid stream, which may include a heated liquid-vapor fuel mixture, is introduced to the cyclonic separation device 100 by being injected through the fluid inlet 110 into the circulating chamber 104. As discussed hereinabove, the fluid inlet 110 is positioned such that the fluid stream introduced to the circulating chamber 104 is injected at an orientation generally tangential to the exterior cylindrical portion 142 and the interior cylindrical portion 152 of the exterior housing 140 and the interior housing 150, respectively.

The fluid stream flows through the circulating chamber 104 in a direction corresponding to the orientation of injection at the fluid inlet 110. In the embodiment depicted in FIGS. 4 and 5, the fluid stream flows in a generally clockwise direction, when evaluated from above looking downwards. Further, the fluid stream 70 flows in a helical orientation, flowing up from the fluid inlet 110 towards the low-density outlet 130. For steady-state operation of the cyclonic separation device 100, it is assumed that the fluid stream 70 enters the cyclonic separation device 100 at a constant flow rate. However, it is recognized that in many applications, the flow can vary.

As depicted in FIG. 4, the cyclonic separation device 100 may begin to separate the fluid stream into a high-density component 72 and a low-density component 74. When the fluid stream 70 is introduced to the cyclonic separation device 100, the fluid stream 70 may include fluid components in various states, for example, in a mixed-phase vapor-liquid flow regime. For example, the fluid stream 70 may include liquid particles (i.e., high-density components) entrained in a gaseous flow field (i.e., low-density components). As the fluid stream 70 enters the circulating chamber 104, the high-density components 74 are carried with the low-density components 72. As the fluid stream 70 continues to flow within the circulating chamber, the change in direction of the fluid stream 70 caused by the exterior cylindrical portion 142 and the interior cylindrical portion 152 may cause the high-density components 74 of the fluid stream 70 to separate from the low-density components 72.

Without being bound by theory, the increased density of the high-density components 74 may prevent the turning induced by the exterior cylindrical portion 142 and the interior cylindrical portion 152 from overcoming the linear-momentum of the high-density components 74, such that the high-density components 74 direct themselves towards the exterior cylindrical portion 142 of the exterior housing 140. As the high-density components 74 contact the exterior cylindrical portion 142, the high-density components 74 are removed from the fluid stream 70 and flow downwards as a result of gravity. In addition, high-density components 74 may collect on the interior cylindrical portion 152 and flow downwards as a result of gravity. The high-density components 74 may collect and be removed from the circulating chamber 104 at the high-density outlet 120. The low-density components 72 of the fluid stream 70 continue to flow through the circulating chamber 104, following the generally helical orientation from the fluid inlet 110 towards the low-density outlet 130.

Figure 5:
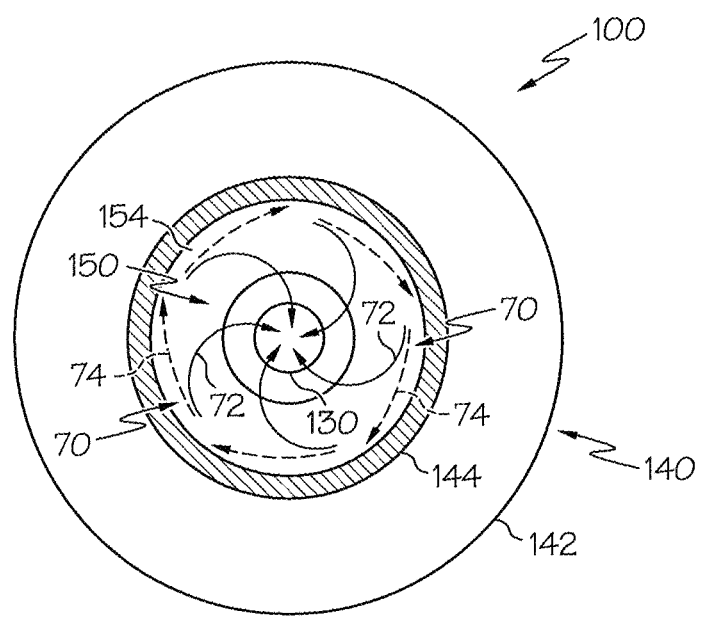
FIG. 5 schematically depicts a top sectional view of a cyclonic separation device shown along line C-C of FIG. 2.

Referring now to FIG. 5, the cyclonic separation device 100 is depicted at a cross-section that intersects the exterior conical portion 144 of the exterior housing 140. Again, without being bound by theory, the decrease in radii of the exterior conical portion 144 and the interior conical portion 154 as compared to the radii of the exterior cylindrical portion 142 and the interior cylindrical portion 152 accelerates the fluid stream 70. The increase in the rotational speed of the fluid stream 70 may further cause the high-density components 74 to separate from the low-density components 72. The high-density components 74 contact one or more of the exterior conical portion 144 or the interior conical portion 154 and flow downwards as a result of gravity. The fluid stream 70, which contains a high proportion of low-density components 72, continues to flow tangentially around the circulating chamber 104, over the interior housing 150 and towards the low-density outlet 130.

Figure 6:
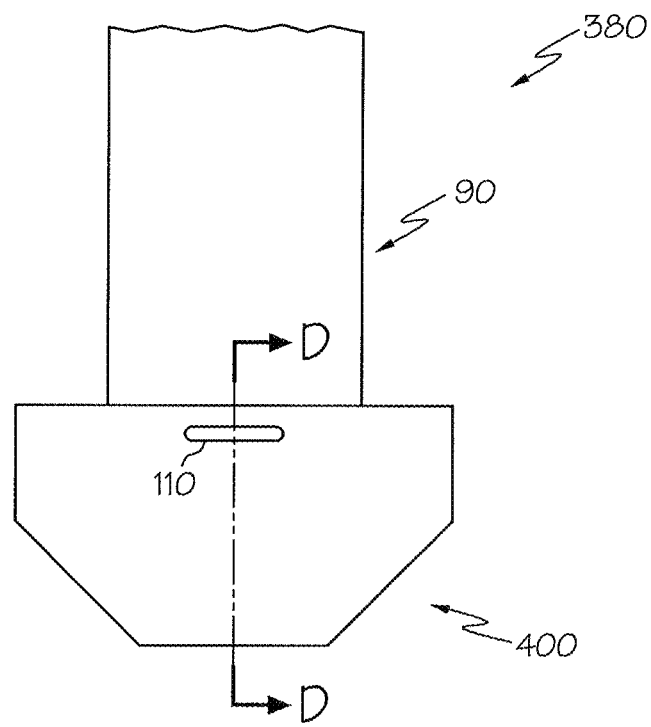
FIG. 6 schematically depicts a partial side view of a fluid stream separating apparatus having a cyclonic separation device according to one or more embodiments shown or described herein.
Figure 7:
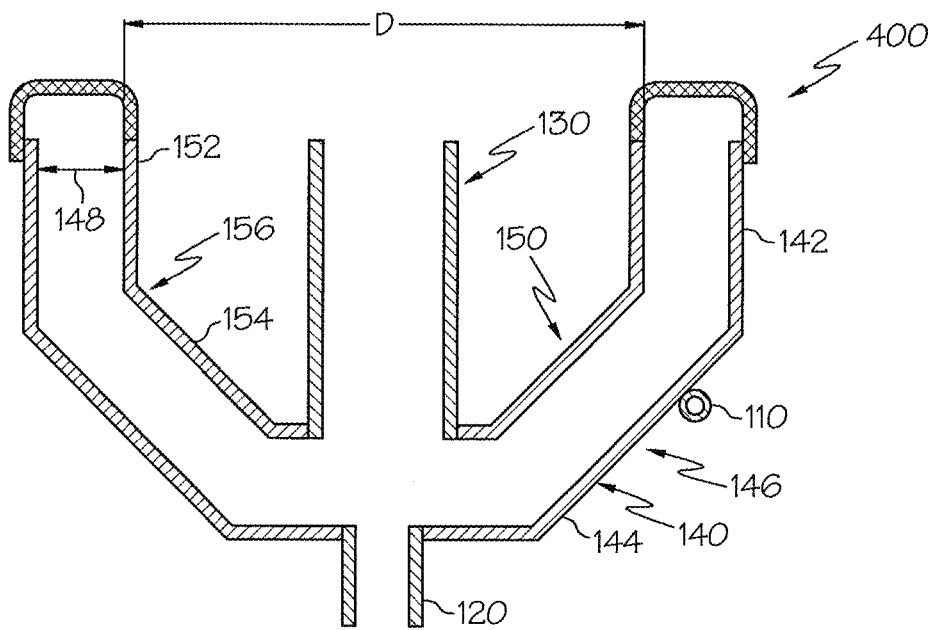
FIG. 7 schematically depicts a front sectional view a cyclonic separation device shown along line D-D of FIG. 6.

Referring now to FIGS. 6 and 7, another embodiment of the cyclonic separation device 400 for a fluid stream separating device 380 is depicted. In this embodiment, the cyclonic separation device 400 is positioned proximate to the bottom of the ceramic monolith 90. As shown in FIG. 7, the cyclonic separation device 400 includes an exterior housing 140 that includes an exterior cylindrical portion 142 and an exterior conical portion 144 extending from the exterior cylindrical portion 142. The exterior cylindrical portion 142 and the exterior conical portion 144 define the exterior wall 146 of the cyclonic separation device 400. The cyclonic separation device 400 also includes an interior housing 150 that includes an interior cylindrical portion 152 and an interior conical portion 154. The interior cylindrical portion 152 and the interior conical portion 154 define the interior wall 156 of the cyclonic separation device 400.

The interior housing 150 is positioned inside of the exterior housing 140, such that the interior housing 150 and the exterior housing 140 form a circulating chamber 104 (see FIG. 4). In the embodiment depicted in FIGS. 6 and 7, the interior cylindrical portion 152 is diametrically inset from the exterior cylindrical portion 142 and positioned to be generally concentric with the exterior cylindrical portion 142. Further, the interior conical portion 154 is inset from the exterior conical portion 144. In the embodiment depicted in FIGS. 6 and 7, the interior conical portion 154 is generally parallel to the exterior conical portion 144.

The cyclonic separation device 400 further includes a low-density outlet 130 coupled to one of the exterior housing 140 or the interior housing 150. In the embodiment of the cyclonic separation device 100 depicted in FIGS. 6 and 7, the low-density outlet 130 is coupled to the interior housing 150 and extends upwards towards the ceramic monolith 90 (see FIG. 6). The low-density outlet 130 places the circulating chamber 104 of the cyclonic separation device 400 in fluid communication with the ceramic monolith 90. In the embodiment depicted in FIGS. 6 and 7, the low-density outlet 130 is positioned at a radial position inwards of the exterior cylindrical portion 142 of the exterior housing 140 and at a radial position inwards of the interior cylindrical portion 152 of the interior housing 150. The low-density outlet 130 is spaced apart from the interior cylindrical portion 152 of the interior housing 150. The cyclonic separation device 400 also includes a high-density outlet 120 in fluid communication with the circulating chamber 104. The high-density outlet 120 may include a flow restrictor, for example and without limitation, a flow area having a reduced cross-sectional area, such that the low-density components of the flow stream flows through the low-density outlet 130 and not through the high-density outlet 120. Alternatively, a mass flow control device may be used.

Figure 8:
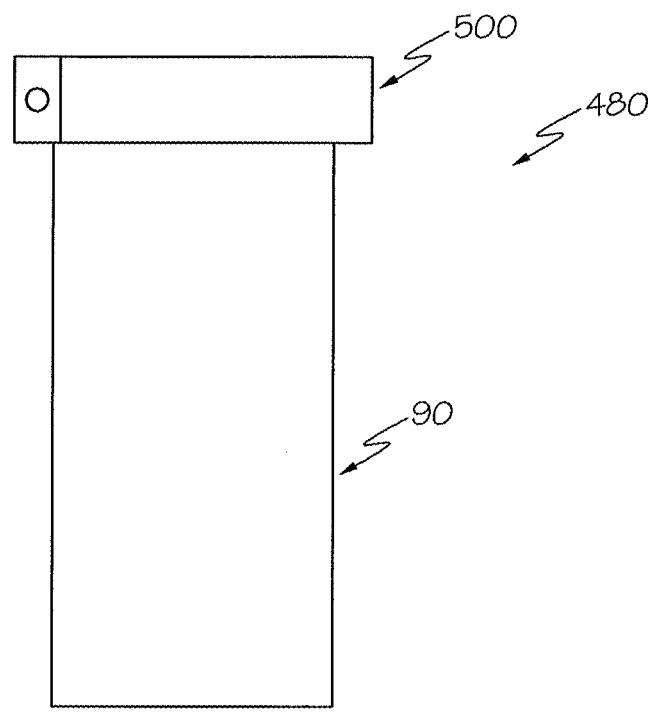
FIG. 8 schematically depicts a side view of a fluid stream separating apparatus having a cyclonic separation device according to one or more embodiments shown or described herein.
Figure 9:
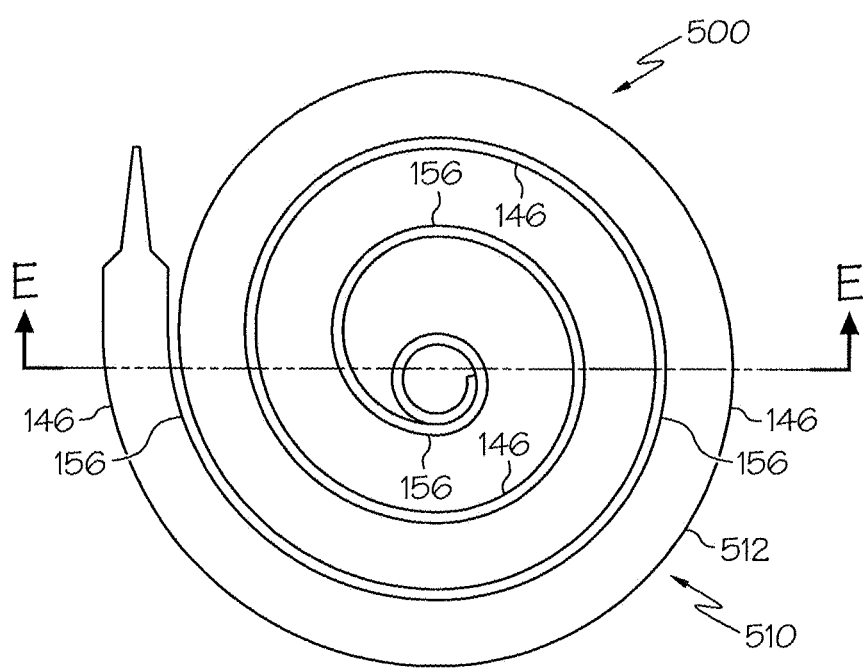
FIG. 9 schematically depicts a top view of the cyclonic separation device for a fluid stream separating apparatus according to one or more embodiments shown or described herein.
Figure 10:
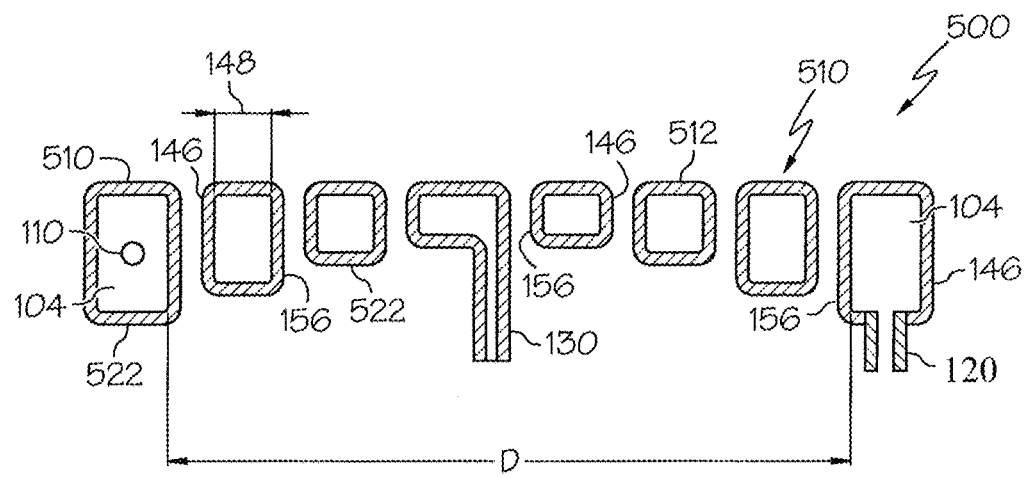
FIG. 10 schematically depicts a side sectional view of a cyclonic separation device shown along line E-E of FIG. 9.

Referring now to FIGS. 8-10, another embodiment of the cyclonic separation device 500 for a fluid stream separating apparatus 480 is depicted. In this embodiment, the cyclonic separation device 500 is positioned proximate to the top of the ceramic monolith 90. Referring now to FIGS. 9 and 10, the cyclonic separation device 500 includes a housing 510 having a spiraled portion 512. The housing 510 of the cyclonic separation device 500 includes an exterior wall 146 and an interior wall 156 that are spaced apart from one another along the spiraled portion 512. The housing 510 further includes an upper wall 520 and a lower wall 522 that are coupled to exterior wall 146 and the interior wall 156 and define the circulating chamber 104.

The cyclonic separation device 500 further includes a fluid inlet 110 coupled to the housing 510. The fluid inlet 110 is positioned and oriented to inject a fluid stream into the circulating chamber 104 at an orientation generally tangential to the exterior wall 146 and the interior wall 156 of the housing 510 at positions proximate to the fluid inlet 110.

The cyclonic separation device 500 further includes a low-density outlet 130 coupled to the housing 510. In the embodiment of the cyclonic separation device 500 depicted in FIGS. 8-10, the low-density outlet 130 is positioned proximate to the center of the spiraled portion 512 of the housing 510 and the low-density outlet 130 extends downwards towards the ceramic monolith 90. The low-density outlet 130 places the circulating chamber 104 of the cyclonic separation device 500 in fluid communication with the ceramic monolith 90. The cyclonic separation device 500 also includes a high-density outlet 120 in fluid communication with the circulating chamber 104. The high-density outlet 120 may include a flow restrictor, for example and without limitation, a flow area having a reduced cross-sectional area, such that the low-density components of the flow stream flows through the low-density outlet 130 and not through the high-density outlet 120.

The interior wall 156 of the housing 510 has a maximum outer diameter D. Further, the housing of the cyclonic separation device 500 includes a spacing between the exterior wall 146 and the interior wall 156. In some embodiments, the spacing between the interior wall 156 and the exterior wall 146 may be less than about 0.2*D. In one embodiment, the outer diameter D may be about 2.3 inches, and the spacing between the interior wall 156 and the exterior cylindrical portion 142 may be about 0.35 inches, such that the spacing between the interior wall 156 and the exterior wall 146 is about 0.15*D. In yet other embodiments, the spacing between the interior wall 156 and the exterior wall 146 may less than about 0.75*D. In yet another embodiment, the outer diameter D may be about 2.3 inches and the spacing between the interior wall 156 and the exterior wall 146 may be about 0.1 inches, such that the spacing between the interior wall 156 and the exterior wall 146 is about 0.043*D.

In some embodiments, the upper wall 520 and the lower wall 522 may be evenly spaced from one another in the housing 510 along the spiraled portion 512. In the embodiment depicted in FIGS. 8 and 9, spacing between the upper wall 520 and the lower wall 522 is uneven along the spiraled portion 512, such that a spacing distance 524 between the upper wall and the lower wall generally decreases in positions approaching the low-density outlet 130.

Operation of the cyclonic separation device 500 depicted in FIGS. 8-10 is similar to the embodiment described with reference to FIGS. 1-2 and 4-5 hereinabove. The spiraled portion 512 of the housing 510 causes an acceleration of the fluid stream as the fluid stream flows further along the spiraled portion 512 of the housing 510. The acceleration of the fluid stream may lead to further separation between the low-density components and the high-density components of the fluid stream. The high-density components may collect along at least one of the exterior wall 146, the interior wall 156, the upper wall 520, and/or the lower wall 522 and flow out of the circulating chamber 104.

Figure 11:
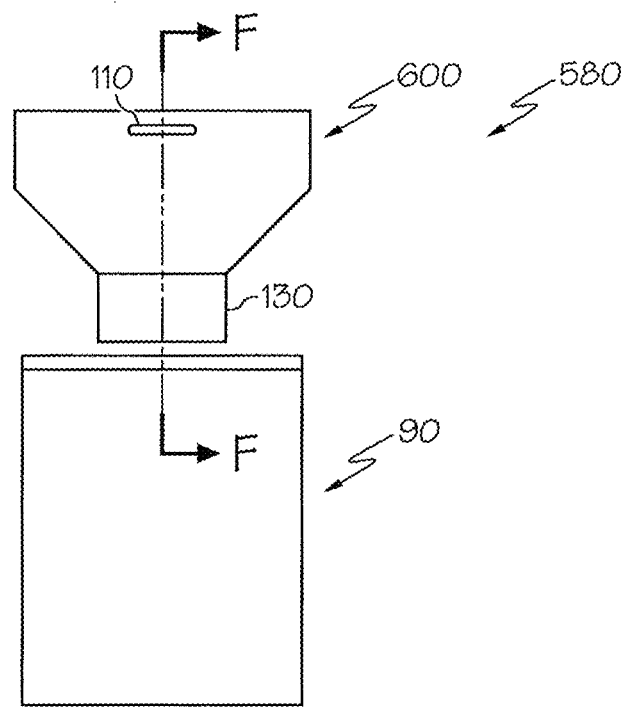
FIG. 11 schematically depicts a side view of a fluid stream separating apparatus having a cyclonic separation device according to one or more embodiments shown or described herein.
Figure 12:
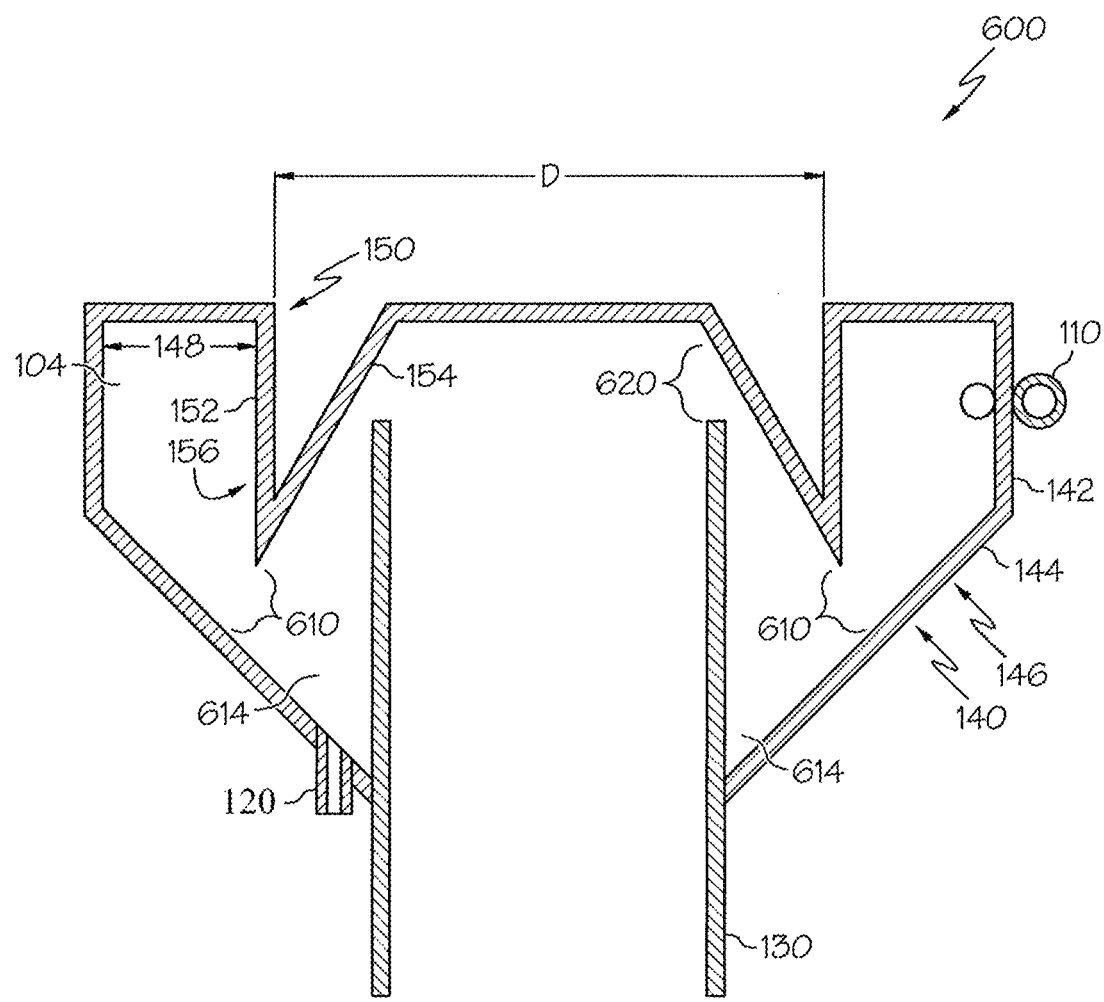
FIG. 12 schematically depicts a side sectional view of a cyclonic separation device shown along line F-F of FIG. 11.

Referring now to FIGS. 11 and 12, another embodiment of the cyclonic separation device 600 for a fluid stream separating apparatus 580 is depicted. In this embodiment, the cyclonic separation device 600 is positioned proximate to the top of the ceramic monolith 90. As shown in FIG. 12, the cyclonic separation device 600 includes an exterior housing 140 that includes an exterior cylindrical portion 142 and an exterior conical portion 144 extending from the exterior cylindrical portion 142. The exterior cylindrical portion 142 and the exterior conical portion 144 define the exterior wall 146 of the cyclonic separation device 600. The cyclonic separation device 600 also includes an interior housing 150 that includes an interior cylindrical portion 152 and an interior conical portion 154. The interior cylindrical portion 152 and the interior conical portion 154 define the interior wall 156 of the cyclonic separation device 600.

The interior housing 150 is positioned inside of the exterior housing 140, such that the interior housing 150 and the exterior housing 140 form a circulating chamber 104 (see FIG. 4). In the embodiment depicted in FIGS. 11 and 12, the interior cylindrical portion 152 is diametrically inset from the exterior cylindrical portion 142 and positioned to be generally concentric with the exterior cylindrical portion 142. Further, the interior conical portion 154 is inset from and angled relative to the exterior conical portion 144. The positioning of interior conical portion 154 and the exterior conical portion 144 defines a pinch point 610 between the interior cylindrical portion 152, the interior conical portion 154, and the exterior conical portion 144. This pinch point 610 may act as a flow restriction, causing acceleration of the flow stream as it flows in the circulating chamber 104. Further, variations in pressure and velocity of the fluid stream at positions proximate to the pinch point 610 may cause an increase in accumulation of high-density components of the fluid stream. High-density components of the fluid stream may collect in a trap volume 614.

The cyclonic separation device 600 further includes a low-density outlet 130 coupled to one of the exterior housing 140 or the interior housing 150. In the embodiment of the cyclonic separation device 100 depicted in FIGS. 11 and 12, the low-density outlet 130 is coupled to the exterior housing 140 and extends downwards towards the ceramic monolith 90. The low-density outlet 130 places the circulating chamber 104 of the cyclonic separation device 600 in fluid communication with the ceramic monolith 90. The low-density outlet 130 extends through the exterior housing 140 and defines an outlet pinch point 620 between the low-density outlet 130 and the interior conical portion 154. This pinch point 620 may act as a flow restriction, causing acceleration of the flow stream as it flows in the circulating chamber 104. Further, variations in pressure and velocity of the fluid stream at positions proximate to the pinch point 620 may cause an increase in accumulation of high-density components of the fluid stream.

In the embodiment depicted in FIGS. 11 and 12, the low-density outlet 130 is positioned at a radial position inwards of the exterior cylindrical portion 142 of the exterior housing 140 and at a radial position inwards of the interior cylindrical portion 152 of the interior housing 150. The low-density outlet 130 is spaced apart from the interior cylindrical portion 152 of the interior housing 150.

The cyclonic separation device 600 also includes a high-density outlet 120 in fluid communication with the circulating chamber 104. The high-density components of the fluid stream may collect at a position proximate to the high-density outlet 120 for removal from the circulating chamber 104. In the depicted embodiment, the high-density outlet 120 is positioned to evacuate high-density components of the fluid stream that collect in the trap volume 614. The high-density outlet 120 may include a flow restrictor, for example and without limitation, a flow area having a reduced cross-sectional area, such that the most of the low-density component of the flow stream flows through the low-density outlet 130 and not through the high-density outlet 120.

Modeling Results

To quantify the performance of each of the cyclonic separation devices 100, 400, 500, 600, computational fluid dynamic (CFD) models of each of the designs were built. In general, CFD models are used to iteratively solve the Navier-Stokes equations that govern the flow of fluid around a defined geometry. A commercially available CFD software tool (Fluent™ available from ANSYS, Inc. of Canonsburg, Pa.) was used to evaluate the designs disclosed hereinabove. The designs were evaluated based on, among other criteria, pressure drop of the fluid flowing through the cyclonic separation devices 100, 400, 500, 600, and droplet trapping efficiency. Trapping efficiency is defined as the ratio between the quantity of trapped droplets and the quantity of injected droplets. An increase in trapping efficiency for a design reflects that the design is more efficient in capturing droplets thereby preventing the droplets from traveling further than the circulating chamber 104 of the cyclonic separation device 100, 400, 500, 600.

The CFD models of each of the designs of the cyclonic separation devices 100, 400, 500, 600 were modeled in three-dimensions. An inlet boundary condition of 5 bar operating pressure with toluene vapor as the working fluid having droplets of toluene liquid with 1 micron diameter was applied to each of the CFD models. The CFD models were converged to steady-state to develop the flow velocity pattern within the cyclonic separation devices 100, 400, 500, 600. The steady-state results were overlayed with transient calculations of droplet propagation developed using a Lagrangian model. An assumption was made that once any droplet touches a wall of the cyclonic separation device 100, 400, 500, 600, the droplet is trapped by the wall and does not propagate further along the circulating chamber 104.

Figure 13:
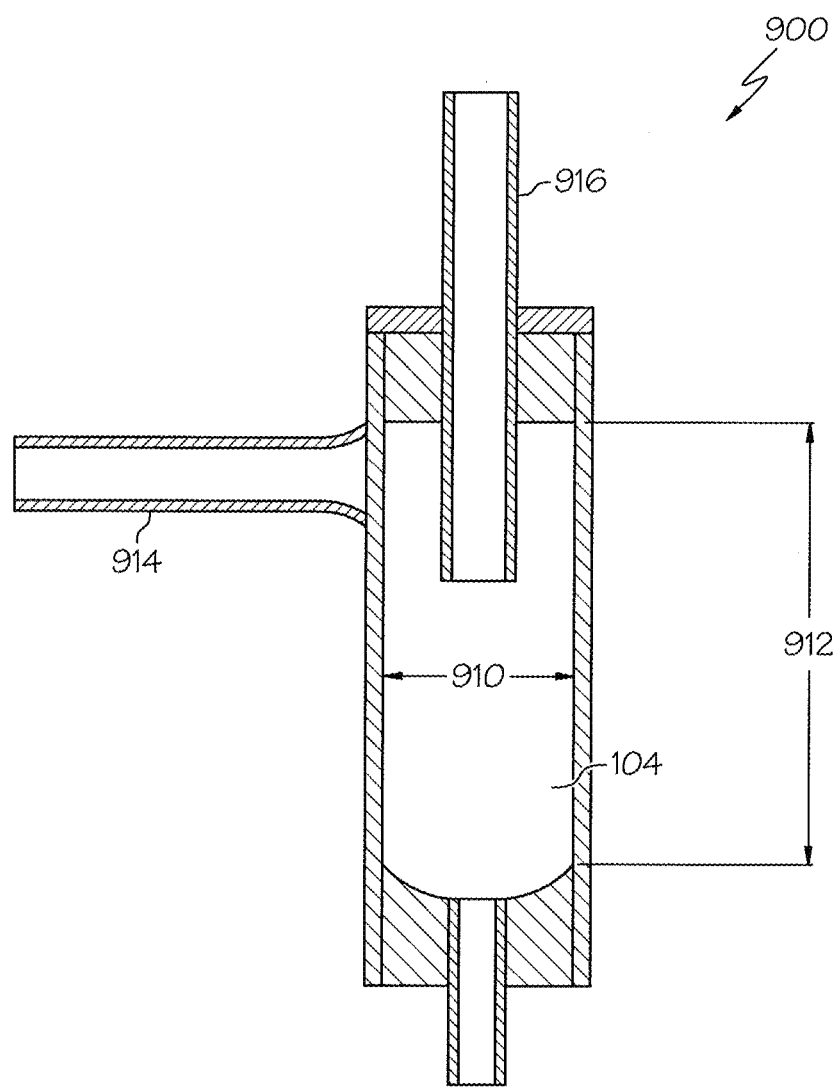
FIG. 13 schematically depicts a side sectional view of a cyclonic separation device according to one or more embodiments shown or described herein; and, FIGS. 14A and B schematically depict a side sectional view and a sectional view taken at line A-A of FIG. 14A (shown in FIG. 14B) of a cyclonic separtaion device according to one or more embodiments shown or described herein.

To quantify performance of each of the designs, a baseline model 900, as depicted in FIG. 13, was also modeled. The baseline model 900 includes a circulating chamber 104 having an interior diameter 910 of about 0.875 inches, an interior length 912 of about 2 inches, an fluid inlet pipe 914 having a diameter of about 0.250 inches arranged to inject a fluid approximately tangentially to the circulating chamber 104. The baseline model 900 further includes a low-density outlet pipe 916 extending upwards from the circulating chamber 104. The low density outlet pipe 916 has a diameter of about 0.375 inches. Performance of the baseline model 900 was evaluated using the same methodology described hereinabove with reference to the cyclonic separation devices 100, 400, 500, 600. A summary of the trapping efficiency and the pressure drop of each of the models is provided in Table 1 below.

TABLE 1

Comparison of Trapping Efficiency and Pressure Drop of Various Designs

| | Trapping Efficiency (%) | Pressure Drop (mBar) |
|---|---|---|
| Baseline Model 900 | 19.5 | 3.18 |
| Cyclonic Separation Device 100 | 31.0 | 0.50 |
| Cyclonic Separation Device 400 | 92 | 113 |
| Cyclonic Separation Device 500 | 51.1 | 20 |
| Cyclonic Separation Device 600 | 38.1 | 1.74 |

As highlighted in Table 1 hereinabove, each of the cyclonic separation devices 100, 400, 500, 600 exhibit increased trapping efficiency over the baseline model 900. An appropriate cyclonic separation device 100, 400, 500, 600 may be selected based on the trapping efficiency and pressure drop requirements of an end-user application.

It should now be understood that cyclonic separation devices according to the present disclosure separate high-density components from low-density components of a fluid stream. The cyclonic separation devices are highly efficient in trapping droplets while maintaining minimal pressure drop of the fluids stream that enters the cyclonic separation device. The cyclonic separation devices include features that accelerate the fluid stream as it flows through the circulating chamber, thereby decreasing the amount of droplets passing beyond the circulating chamber. The cyclonic separation devices may be incorporated into fluid stream separating apparatuses having ceramic monoliths coated with a functional membrane. Use of the cyclonic separation device may increase the useful life of the ceramic monolith. Further, some embodiments of the cyclonic separation devices allow for at least a portion of the ceramic monolith to be positioned inside the cyclonic separation device, which may improve the ability to package the fluid stream separating apparatus in a constrained environment.

Figure 14:
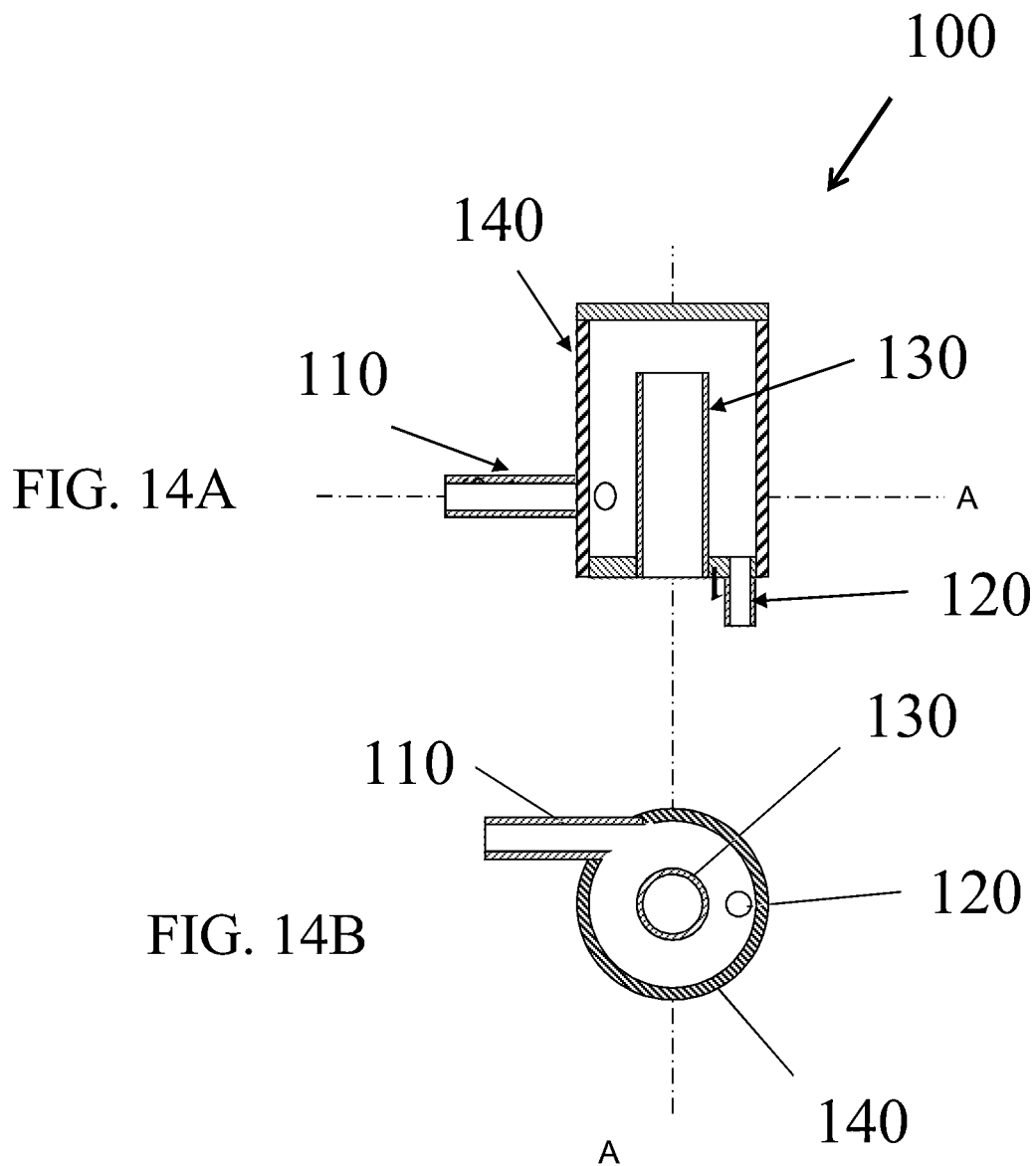

In an embodiment, the cyclonic separation devices are incorporated into fluid stream separating apparatuses having ceramic monoliths coated with a functional membrane such that the separated low density fluid stream is directed to a majority of the monolith membrane channels and the separated high density fluid stream is bypassed or directed to a minority of the monolith membrane channels. For example, the device (700), illustrated in FIG. 14, and similar in dimensions to the baseline separator (900), was constructed and used to separate a partially vaporized regular gasoline (110) into two streams. FIGS. 14A and B schematically depict a side sectional view and a sectional view taken at line A-A of FIG. 14A (shown in FIG. 14B) of a cyclonic separtaion device according to one or more embodiments shown or described herein. The low density saturated vapor stream was directed (130) to a pervaporation membrane as described in co-pending-U.S. Patent Application 61/476, 988. The higher density liquid stream was taken (120) through a mass flow controller set to extract all of the liquid and a very small amount of vapor and collected. Permeate and Retentate streams from the membrane separation were collected. The results are shown in the Table 2.

TABLE 2

Example Separation of Partially Vaporized Gasoline

| | E10 Gasoline | Low Density | High Density | Permeate | Retentate |
|---|---|---|---|---|---|
| Yield, wt % | 100 | 68.9 | 31.1 | 25.0 | 43.9 |
| Density, g/cc | 0.7498 | 0.7348 | 0.7851 | 0.7553 | 0.7485 |
| Octane No, RON | 92.6 | 91.7 | 92.7 | 101.2 | 88.3 |
| Color | Light Yellow | Colorless | Dark Yellow | Colorless | Colorless |
| Ethanol, wt % | 10.5 | 13.6 | 4.1 | 26.4 | 5.0 |

The light yellow 92.6 RON E10 gasoline was about 70% vaporized by pressurizing to 5 barg and heating to 160° C. while maintaining a flow of 0.49 g/s to the cyclone separator (700). The low density saturated vapor separated was sampled and found to be colorless, contained the majority of the ethanol fed and had an octane rating of 91.7 RON. The high density liquid separated product collected was dark yellow with an octane rating of 92.7 RON. Membrane separation of the low density saturated vapor gave 25% yield on the original E10 gasoline feed of high octane 101 RON permeate enriched in ethanol, and a lower octane 88.3 retentate depleted of ethanol. The cyclone separation effectively removed the high boiling color bodies from the membrane feed, thereby improving the membrane separation.

In an aspect (1), the present description provides a cyclonic separation device for separating a fluid stream into high-density components and low-density components, the cyclonic separation device comprising: an exterior housing comprising an exterior conical portion; an interior housing comprising an interior conical portion, wherein the interior housing is positioned relative to the exterior housing to form a circulating chamber; a fluid inlet coupled to the exterior housing, the fluid inlet positioned to inject a fluid stream into the circulating chamber at an orientation generally tangential to the circulating chamber and a low-density outlet coupled to at least one of the exterior conical portion or the interior conical portion, the low-density outlet adapted to extract the low-density components from the circulating chamber and a high density outlet adapted to extract the high density components from the circulating chamber.

In an aspect (2), the disclosure provides the cyclonic separation device of aspect 1, wherein the exterior housing further comprises an exterior cylindrical portion and wherein the interior housing further comprises an interior cylindrical portion.

In an aspect (3), the disclosure provides the cyclonic separation device of aspects 1 or 2, wherein the low-density outlet is positioned at a radial position inwards of the exterior cylindrical portion of the exterior housing.

In an aspect (4), the disclosure provides the cyclonic separation device of aspects 1 or 2, wherein the low-density outlet is positioned at a radial position inwards of the interior cylindrical portion of the interior housing.

In an aspect (5), the disclosure provides the cyclonic separation device of aspect 2, wherein the interior cylindrical portion has an outer diameter D, and a spacing between the interior cylindrical portion and the exterior cylindrical portion is less than about 0.2*D.

In an aspect (6), the disclosure provides the cyclonic separation device of aspect 2, wherein the interior cylindrical portion has an outer diameter D, and a spacing between the interior cylindrical portion and the exterior cylindrical portion is less than about 0.075*D.

In an aspect (7), the disclosure provides the cyclonic separation device of any one of aspects 1-6, wherein the interior conical portion is inset from and generally parallel to the exterior conical portion.

In an aspect (8), the disclosure provides the cyclonic separation device of any one of aspects 1-6, wherein the interior conical portion is inset from and angled with respect to the exterior conical portion, and the interior conical portion and the interior cylindrical portion define a pinch point with the exterior conical portion.

In an aspect (9), the disclosure provides the cyclonic separation device of aspect 8, wherein a flow area of the circulating chamber evaluated at the pinch point is less than the flow area of the circulating chamber evaluated between the exterior cylindrical portion and the interior cylindrical portion at the fluid inlet.

In an aspect (10), the disclosure provides the cyclonic separation device of any one of aspects 1-9, wherein the low-density outlet extends into the circulating chamber and defines a trap volume between the low-density outlet and one of the exterior conical portion or the interior conical portion.

In an aspect (11), the disclosure provides the cyclonic separation device of aspect 1 wherein the high-density outlet is coupled to at least one of the exterior conical portion or the interior conical portion.

In an aspect (12), the disclosure provides a cyclonic separation device for separating a fluid stream into high-density components and low-density components, the cyclonic separation device comprising: a housing comprising an interior wall and an exterior wall that define a circulating chamber, where the interior wall has an outer diameter D, and a spacing between the interior wall and the exterior wall is less than about $0.2*D$; a fluid inlet coupled to the housing and positioned to inject a fluid stream into the circulating chamber at an orientation generally tangential to the interior wall and the exterior wall of the housing at positions proximate to the fluid inlet; and a low-density outlet coupled to the housing and located at a radial position inwards of the fluid inlet, wherein the interior wall and the exterior wall of the housing direct the fluid stream from the fluid inlet towards the low-density outlet.

In an aspect (13) the disclosure provides the cyclonic separation device of aspect 12, wherein the spacing between the interior wall and the exterior wall is less than about $0.075*D$.

In an aspect (14), the disclosure provides the cyclonic separation device of aspect 12 or 13, wherein the interior wall comprises an interior cylindrical portion and an interior conical portion extending from the interior cylindrical portion and the exterior wall comprises an exterior cylindrical portion and an exterior conical portion extending from the exterior cylindrical portion.

In an aspect (15) the disclosure provides the cyclonic separation device of any one of aspects 12-14, wherein the interior wall and the exterior wall comprise a spiraled portion extending radially outwards from the low-density outlet.

In an aspect (16) the disclosure provides the cyclonic separation device of aspect 15, wherein the housing further comprises an upper wall and a lower wall coupled to the exterior wall and the interior wall, wherein a spacing between the upper wall and the lower wall generally decreases in positions approaching the low-density outlet.

In an aspect (17), the disclosure provides a fluid stream separating apparatus separating a fluid stream into multiple components, the fluid stream separating apparatus comprising: a ceramic monolith comprising: an array of parallel channels separated by porous channel walls extending along an axial length of the ceramic monolith; a functional membrane coating a plurality of the porous channel walls of the ceramic monolith, the functional membrane functioning to separate the fluid stream into a retentate portion and a permeate portion, wherein the retentate portion exits the ceramic monolith in substantial portion through the array of parallel channels and the permeate portion exits the ceramic monolith radially outward through a skin of the ceramic monolith; and a cyclonic separation device for separating the fluid stream into high-density components and low-density components in fluid communication with the ceramic monolith, the cyclonic separation device comprising: a housing comprising a conical interior wall and a conical exterior wall that define a circulating chamber; a fluid inlet coupled to the housing and positioned to inject a fluid stream into the circulating chamber at an orientation generally tangential to the interior wall and the exterior wall of the housing at positions proximate to the fluid inlet; and a low-density outlet coupled to the housing and located at a radial position inwards of the fluid inlet, a low-density outlet coupled to at least one of the conical exterior wall or the conical interior wall, the low-density outlet adapted to extract the low-density components from the circulating chamber; a high density outlet adapted to extract the high density components from the circulating chamber wherein the interior wall and the exterior wall of the housing direct the low density fluid stream from the fluid inlet towards the low-density outlet and the high density fluid stream to the high density outlet.

In an aspect (18), the disclosure provides the cyclonic separation device of aspect 17, wherein the interior wall further comprises an interior cylindrical portion and an interior conical portion extending from the interior cylindrical portion and the exterior wall further comprises an exterior cylindrical portion and an exterior conical portion extending from the exterior cylindrical portion.

In an aspect (19) disclosure provides the cyclonic separation device of aspect 17, wherein at least a portion of the ceramic monolith is positioned inside the interior cylindrical portion of the housing.

In an aspect (20), the disclosure provides the cyclonic separation device of aspect 19, wherein the low-density outlet is positioned at a radial position inwards of the interior cylindrical portion of the interior wall.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:
1. A cyclonic separation device for separating a fluid stream into high-density components and low-density components, the cyclonic separation device comprising:
an exterior housing comprising an exterior conical portion and an exterior cylindrical portion;
an interior housing comprising an interior cylindrical portion and an interior conical portion extending from the interior cylindrical portion, wherein the interior housing is positioned relative to the exterior housing to form a circulating chamber;
a fluid inlet coupled to the exterior housing, the fluid inlet positioned to inject a fluid stream into the circulating chamber at an orientation generally tangential to the circulating chamber;
a low-density outlet coupled to at least one of the exterior conical portion or the interior conical portion, the low-density outlet adapted to extract the low-density components from the circulating chamber; and
a high density outlet radially offset from the low-density outlet and adapted to extract the high density components from the circulating chamber.

2. The cyclonic separation device of claim 1, wherein the low-density outlet is positioned at a radial position inwards of the exterior cylindrical portion of the exterior housing.

3. The cyclonic separation device of claim 1, wherein the low-density outlet is positioned at a radial position inwards of the interior cylindrical portion of the interior housing.

4. The cyclonic separation device of claim 1, wherein the interior cylindrical portion has an outer diameter D, and a spacing between the interior cylindrical portion and the exterior cylindrical portion is less than about 0.075*D.

5. The cyclonic separation device of claim 1, wherein the interior conical portion is inset from and angled with respect to the exterior conical portion, and the interior conical portion and the interior cylindrical portion define a pinch point with the exterior conical portion.

6. The cyclonic separation device of claim 5, wherein a flow area of the circulating chamber evaluated at the pinch point is less than the flow area of the circulating chamber evaluated between the exterior cylindrical portion and the interior cylindrical portion at the fluid inlet.

7. The cyclonic separation device of claim 1, wherein the low-density outlet extends into the circulating chamber and defines a trap volume between the low-density outlet and one of the exterior conical portion or the interior conical portion.

8. The cyclonic separation device of claim 1 wherein the high-density outlet is coupled to at least one of the exterior conical portion or the interior conical portion.

9. The cyclonic separation device of claim 1, wherein the interior cylindrical portion has an outer diameter D, and a spacing between the interior cylindrical portion and the exterior cylindrical portion is less than about 0.2*D.

10. The cyclonic separation device of claim 1, wherein the interior conical portion is inset from and generally parallel to the exterior conical portion.

11. The cyclonic separation device of claim 10, wherein the low-density outlet is positioned at a radial position inwards of the exterior cylindrical portion of the exterior housing.

12. The cyclonic separation device of claim 10, wherein the low-density outlet is positioned at a radial position inwards of the interior cylindrical portion of the interior housing.

13. A cyclonic separation device for separating a fluid stream into high-density components and low-density components, the cyclonic separation device comprising:
   an exterior housing comprising an exterior conical portion and an exterior cylindrical portion;
   an interior housing comprising an interior cylindrical portion and an interior conical portion extending from the interior cylindrical portion, wherein the interior housing is positioned relative to the exterior housing to form a circulating chamber;
   a fluid inlet coupled to the exterior conical portion of the exterior housing, the fluid inlet positioned to inject a fluid stream into the circulating chamber at an orientation generally tangential to the circulating chamber;
   a low-density outlet coupled to at least one of the exterior conical portion and the interior conical portion, the low-density outlet adapted to extract the low-density components from the circulating chamber; and
   a high density outlet adapted to extract the high density components from the circulating chamber.

14. A cyclonic separation device for separating a fluid stream into high-density components and low-density components, the cyclonic separation device comprising:
   an exterior housing comprising an exterior conical portion and an exterior cylindrical portion;
   an interior housing comprising an interior cylindrical portion and an interior conical portion extending from the interior cylindrical portion, wherein the interior housing is positioned relative to the exterior housing to form a circulating chamber and the interior conical portion is parallel to the exterior conical portion throughout a length of the interior conical portion;
   a fluid inlet coupled to the exterior housing, the fluid inlet positioned to inject a fluid stream into the circulating chamber at an orientation generally tangential to the circulating chamber;
   a low-density outlet coupled to at least one of the exterior conical portion and the interior conical portion, the low-density outlet adapted to extract the low-density components from the circulating chamber; and
   a high density outlet adapted to extract the high density components from the circulating chamber.

* * * * *